July 18, 1967  S. O. S. STARK  3,331,902
METHOD OF PRODUCING FILLED AND SEALED CONTAINERS
Filed Aug. 30, 1965  3 Sheets-Sheet 1

INVENTOR
Sven Olof Sören Stark
BY *Pierce, Scheffler & Parker*
ATTORNEYS

July 18, 1967  S. O. S. STARK  3,331,902
METHOD OF PRODUCING FILLED AND SEALED CONTAINERS
Filed Aug. 30, 1965  3 Sheets-Sheet 2
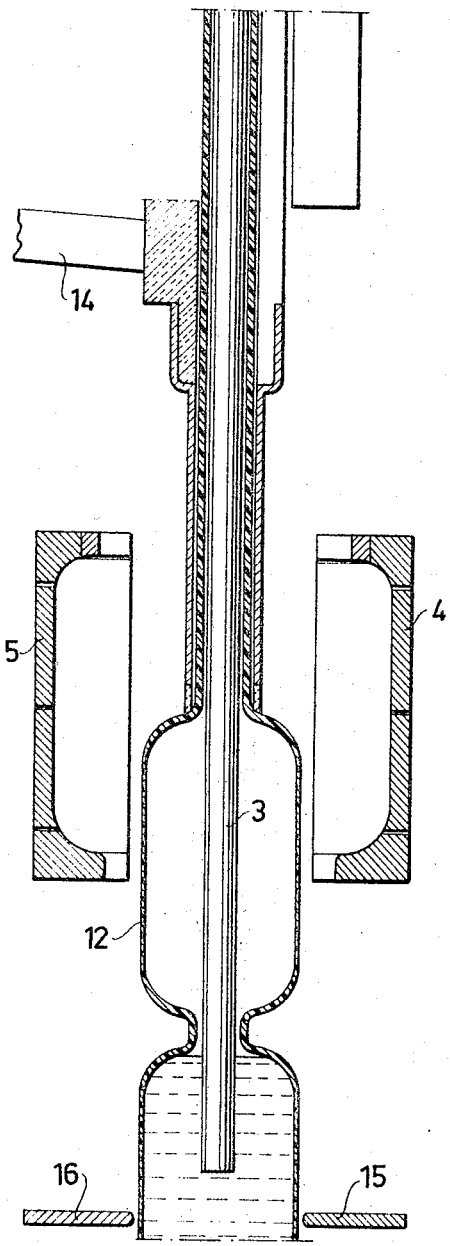
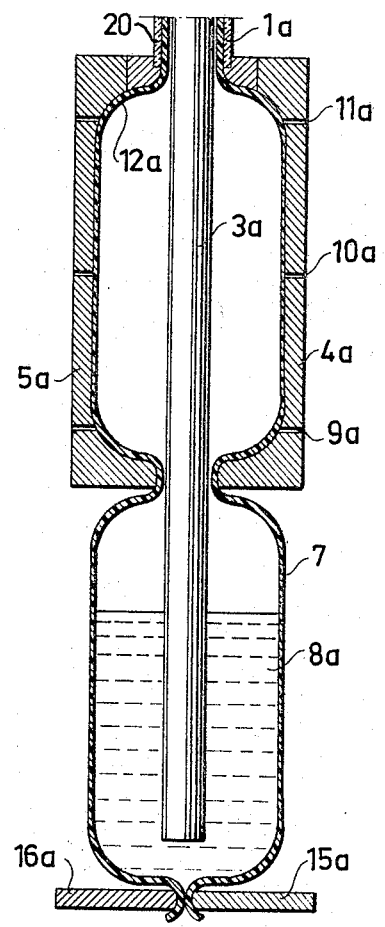
INVENTOR
Sven Olof Sören Stark
BY Pierce, Scheffler & Parker
ATTORNEYS INVENTOR
Suen Olof Sören Stark BY Pierce, Scheffler & Parker
ATTORNEYS United States Patent Office 3,331,902
Patented July 18, 1967

3,331,902
METHOD OF PRODUCING FILLED AND
SEALED CONTAINERS
Sven Olof Sören Stark, Malmohus, Sodra Sandby, Sweden
Filed Aug. 30, 1965, Ser. No. 483,512
6 Claims. (Cl. 264—99)

ABSTRACT OF THE DISCLOSURE

A tube of thermoplastic material, closed at one end, is inflated with gas adjacent to said closed end to form a first container, said first container is filled with filling material thereby displacing gas therefrom which is conducted into and serves to inflate the adjacent portion of said tube and form a second container, the first container is then sealed off from the second container and the described sequence of operations is then repeated with the second and succeeding containers.

---

This invention relates to a continuous and high speed method for packaging fluid, semi-fluid and powdered or granular materials in blowable containers.

Such containers have proven their value in providing light, compact, economical and attractive packages for many different kinds of filling materials. In the packaging of materials of the above described kind the containers have heretofore been produced before the packaging operation proper. Attempts have been made to blow the containers in connection with the filling operation, using the filling material as a blowing propellant. However, those known methods are not applicable to materials that are blowable only when heated, since the filling material will cool the packaging material. Accordingly, a primary object of this invention is to provide a new or improved and more satisfactory method for packaging fluid, semi-fluid and powdered or granular materials.

Another object of the present invention is the provision of an improved continuous and high speed method for packaging such filling materials in individual fluid-tight blown containers using the pressure of a gas displaced from a first produced container during the filling of said first container for blowing a second container, said first and second containers being blown from a warm tube of a thermoplastic material.

Still another object of the present invention is to provide an improved packaging procedure in which one or more elongated tubelike containers are concomitantly formed from a tube and filled with a fluid, semi-fluid or powdered material, then sealed at spaced intervals while being continuously or intermittently advanced in the longitudinal direction of the tube, and finally severed at the sealed areas to provide individual or a series of interconnected packages.

More precisely the present invention concerns a method of producing filled and sealed containers including, in combination, the following operations:

(A) Forming a warm tube from a thermoplastic blowable material;
(B) Closing the end of said tube;
(C) Blowing from a part of said tube a first container;
(D) Filling the said first container with a filling material;
(E) Using the pressure of a gas displaced from the said first container during the filling of said first container for blowing a second container; and
(F) Sealing the top of said first container before filling and sealing the said second container.

Figure 1:
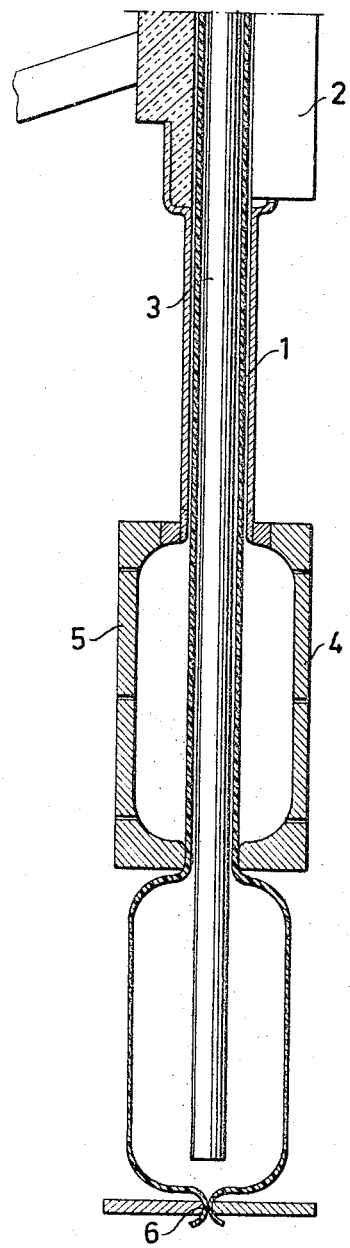
Figure 2:
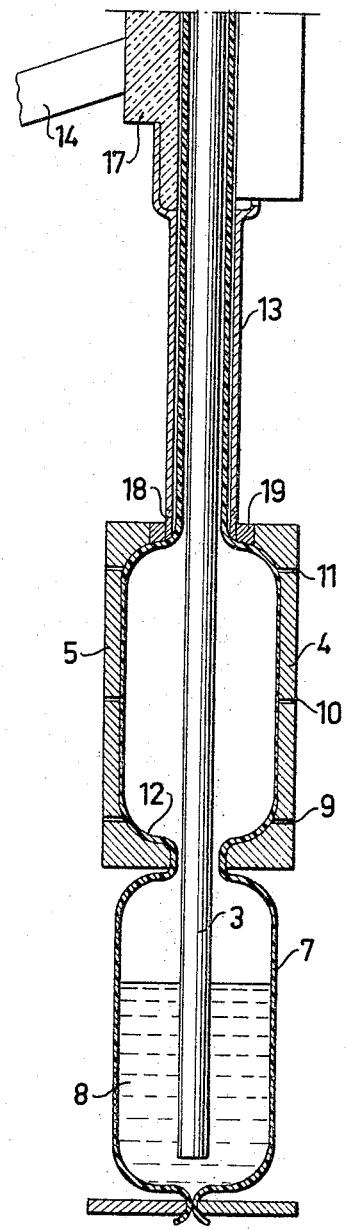
Figure 5:
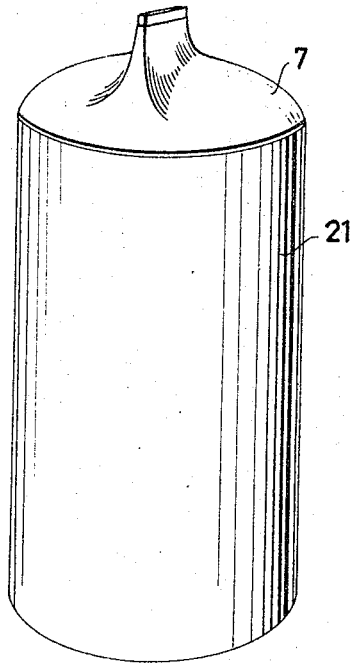
Figure 6:
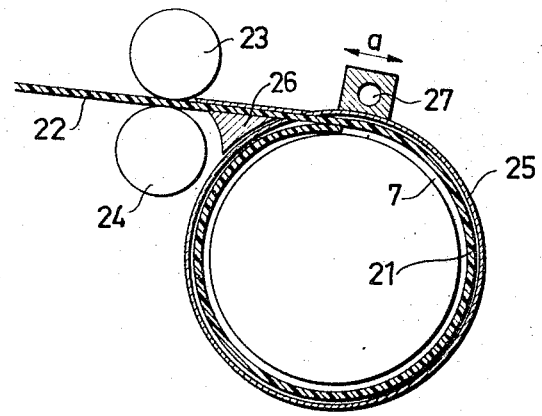

This and other objects, features and advantages will become apparent from the following description of the invention and the drawings relating thereto in which:

FIGURE 1 is a diagrammatic side view of a portion of an apparatus employed in the practice of the present invention;
FIGURES 2 and 3 are corresponding side views of the same portion of the apparatus shown in different stages of the working operation of the apparatus;
FIGURE 4 is a view corresponding to FIGURE 2 of a modified apparatus;
FIGURE 5 is a perspective view of a container produced by using the invention;
FIGURE 6 is a horizontal section through the package according to FIGURE 5 and through a diagrammatically shown apparatus for providing said package with a cylindrical casing.

The apparatus shown in FIGURE 1 is supplied with a web (not shown) of a heat-sealable, blowable, thermoplastic material. Said web is formed into a tube 1, using known means, and therefore not shown, except for a heating jaw 2 for providing a longitudinal heat seal. Said tube is advanced in its longitudinal direction surrounding a stationary filling pipe 3, occupying substantially the entire interior of the tube. Said filling pipe extends through a form, comprising two separable halves 4 and 5, said tube 1 being advanced around the said filling pipe by said form.

According to the present invention containers are made through; closing the free end 6 of the tube 1; blowing from a part of said tube a first container 7; and filling the said first container 7 with a filling material 8 (see FIGURE 2). When filling the said first container 7, gas from said container is displaced from the container and pressed outside the filling pipe 3, blowing up the tube 1 in the form 4, 5 into contact with the walls of said form. The walls of said form 4, 5 are provided with apertures 9, 10, 11 for allowing air in said form to escape. Said apertures 9, 10, 11 may be connected to a vacuum source for facilitating the blowing of said second container 12 (see FIGURE 2). To warm the tube 1 to a temperature suitable for blowing, the tube 1 is fed through a hollow electrode 13. Said electrode 13 is preferably connected to high-frequency circuit, including the filling pipe 3 as an earthed electrode.

The electrode 13 is mounted on a swingable lever 14. When the said second container 12 is blown as described above, the lever 14 swings the electrode 13 downwardly, as shown in FIGURE 3, through the opened form 4, 5 pushing the second container 12 to the position occupied by the first container 7 in FIGURE 1. In said position the top of the first container and the bottom of the second container are flatpressed and sealed by two heat-sealing jaws 15 and 16, which may be combined with a knife or any similar device for separating said first and second containers. The separation may be performed by said jaws, when using a suitable form, temperature and pressure for said jaws.

When said first container is separated from said second container, the latter acts as a first container for producing the next one. Thus, the operation cycle is repeated.

In FIGURES 1–3 is further shown an isolating body 17 for holding the electrode 13, and an isolating end ring 18 for isolating the electrode 13 from the worm 4, 5, the upper end of said form being provided with a sealing 19. Preferably, this sealing is made of yieldable material which also has electric isolating characteristics.

FIGURE 4 shows a modified apparatus for performing the method according to the invention. Said apparatus is shown in a position corresponding to FIGURE 2 and differs from the apparatus shown in said figure only with regard to the device for producing the warm tube used for blowing said first and second containers. In the apparatus according to FIGURE 4 the tube 1a is extruded from a nozzle 20, the orifice of the nozzle being formed between the nozzle proper and the filling pipe 3a. In FIGURE 4 the remaining parts of the apparatus shown have been designated by the same reference numerals as the corresponding parts in FIGURES 1-3, but with the addition of the letter a.

FIGURE 5 shows a container 7 made in an apparatus according to FIGURES 1-3 or 4 and provided with a cylindrical casing 21 of a rigid material.

FIGURE 6 shows an apparatus for providing the container 7 with the casing 21 shown in FIGURE 5. Said casing 21 is fed in the form of a web material 22 by two feeding rolls 23 and 24 into a gap between the container 7 and an outer casing 25. Said casing 25 consists of a thin metal band, one end of said metal band is mounted in a stationary support 26, the other end of the band being mounted in a support 27 which is movable in the direction of the double arrow a. When the movable support 27 is moved to the left in the figure, the casing 21 is pressed against the container 7. In that position the web material 22 is severed by a knife (not shown). The casing 21 may be attached to the container 7 in any suitable way, e.g. by glueing or heat-sealing.

Since the container according to the invention has a bottom which is not plane, the outer cylindrical casing 21 has to extend past the bottom end of the container.

One advantage of the invention is that the container is made thicker in those parts where the strains are greatest, namely in the areas of the neck and the bottom.

Preferably the method according to the invention is presumed to be used for filling a container with carbonated liquids, the carbonic acid being used as an additional gas for blowing the second container.

Above, the warming of the tube 1 has been said to be effected by a high frequency electrode, but of course the warming of the tube may be provided in any suitable way, e.g. by using a warm gas. Alternatively, the warming may be produced by using ultra sonic vibration.

It is seen from the above description that the objects of the invention are well fulfilled by the method described. The description is intended to be illustrative only and it is to be understood that changes and variations may be made without departing from the spirit and scope of the invention as defined by the appended claims.

I claim:
1. A method of producing filled and sealed containers comprising forming a blowable warm tube of thermoplastic material, closing the end of said tube, blowing a part of said tube to form a first container, filling said first container with a filling material, using the gas displaced from said first container by the filling thereof for blowing another part of said tube to form a second container and sealing said tube between said first and second containers to close the top of said first container and the bottom of said second container.

2. A method as defined in claim 1 in which said blowable warm tube of thermoplastic material is made by forming a tube from a web of thermoplastic material, heat sealing the adjacent longitudinal edges of said web and warming the resulting tube.

3. A method as defined in claim 1 in which said blowable warm tube of thermoplastic material is formed by extruding a warm thermoplastic material.

4. A method as defined in claim 1 in which a gas is supplied to said first container with said filling material.

5. A method as defined in claim 4 in which said gas is dissolved in the filling material.

6. A method as defined in claim 1 in which said sealing is effected by heat and pressure.

References Cited

UNITED STATES PATENTS 2,958,171  11/1960  Deckers.
3,267,185  8/1966  Freeman _____ 264—99

FOREIGN PATENTS 954,473  4/1964  Great Britain.

ROBERT F. WHITE, *Primary Examiner.*
A. R. NOE, *Assistant Examiner.*